(12) United States Patent
Bernard et al.

(10) Patent No.: US 7,318,646 B2
(45) Date of Patent: Jan. 15, 2008

(54) SYSTEM FOR PROJECTING A VIRTUAL IMAGE WITHIN AN OBSERVER'S FIELD OF VIEW

(75) Inventors: Stefano Bernard, Orbassano (IT); Piermario Repetto, Orbassano (IT); Pietro Perlo, Orbassano (IT); Nereo Pallaro, Orbassano (IT); Davide Capello, Orbassano (IT); Nello Li Pira, Orbassano (IT); Vito Lambertini, Orbassano (IT); Mauro Brignone, Orbassano (IT)

(73) Assignee: CRF Societa Consortile per Azioni, Turin (IT)

( * ) Notice: Subject to any disclaimer, the term of this patent is extended or adjusted under 35 U.S.C. 154(b) by 150 days.

(21) Appl. No.: 11/070,696

(22) Filed: Mar. 3, 2005

(65) Prior Publication Data

US 2005/0195491 A1     Sep. 8, 2005

(30) Foreign Application Priority Data

Mar. 4, 2004    (EP) ................................. 04425141

(51) Int. Cl.
  *G03B 21/26*  (2006.01)
  *H04N 5/70*   (2006.01)
(52) U.S. Cl. .................. 353/28; 353/122; 348/801; 348/115; 345/7
(58) Field of Classification Search ............. 353/10, 353/7, 28, 29, 39, 94, 122; 349/11, 13, 15–17, 349/69; 348/798–804, 115; 345/7, 8
See application file for complete search history.

(56) References Cited

U.S. PATENT DOCUMENTS 5,754,344 A * 5/1998 Fujiyama ................ 359/631
5,883,606 A    3/1999 Smoot
6,072,445 A    6/2000 Spitzer et al.
6,519,090 B2 * 2/2003 Endo et al. .............. 359/643
6,570,324 B1  5/2003 Tutt et al.
2002/0030636 A1 * 3/2002 Richards ................... 345/8
2004/0021950 A1 * 2/2004 Norton ..................... 359/631
2004/0108971 A1 * 6/2004 Waldern et al. ............ 345/8
2005/0174651 A1 * 8/2005 Spitzer et al. ............. 359/630

FOREIGN PATENT DOCUMENTS

WO    WO 02/071104 A2    9/2002
WO    WO 2004/046767 A2  6/2004

* cited by examiner

*Primary Examiner*—Andrew T Sever
(74) *Attorney, Agent, or Firm*—Sughrue Mion, PLLC

(57) ABSTRACT

A system for projecting a virtual image within an observer's field of view comprises a support element, a transparent element mounted on the support element and suitable for being placed in front of the observer's eyes, the transparent element comprising a first face and a second face, an image display device suitable for forming an additional image, and a projection and focusing device for projecting the additional image in a manner such as to present it superimposed on the image of the outside world. The display device comprise light-emitting devices disposed on one of the faces of the transparent element, and the projection and focusing device comprise optical elements associated with respective emitting devices and arranged on the other face. Each of the optical elements creates a virtual image of the emitting device associated therewith. The virtual images of the emitting devices together form the additional image.

14 Claims, 5 Drawing Sheets

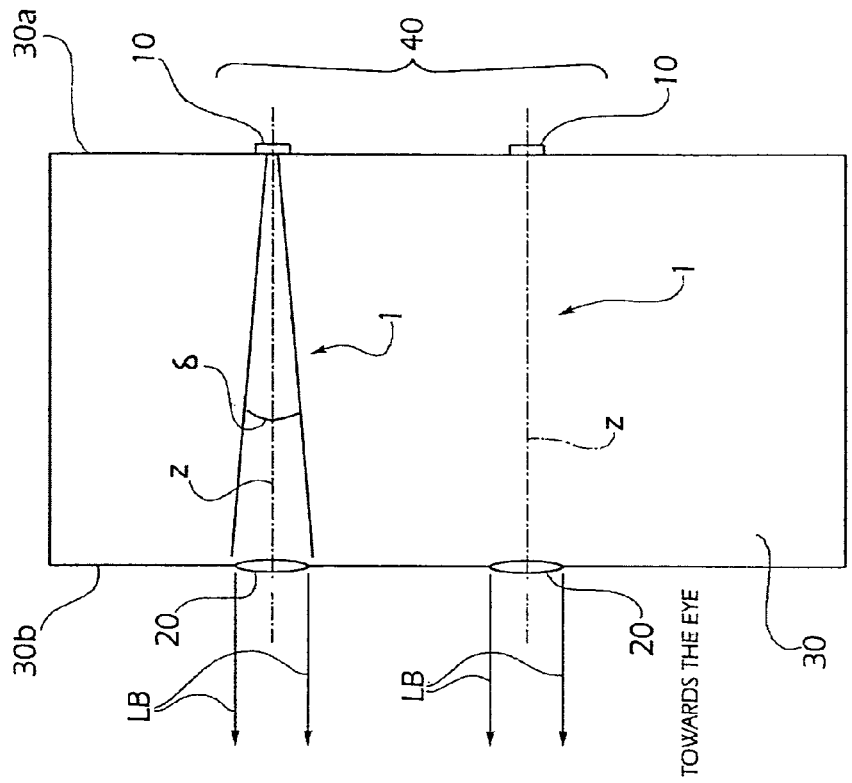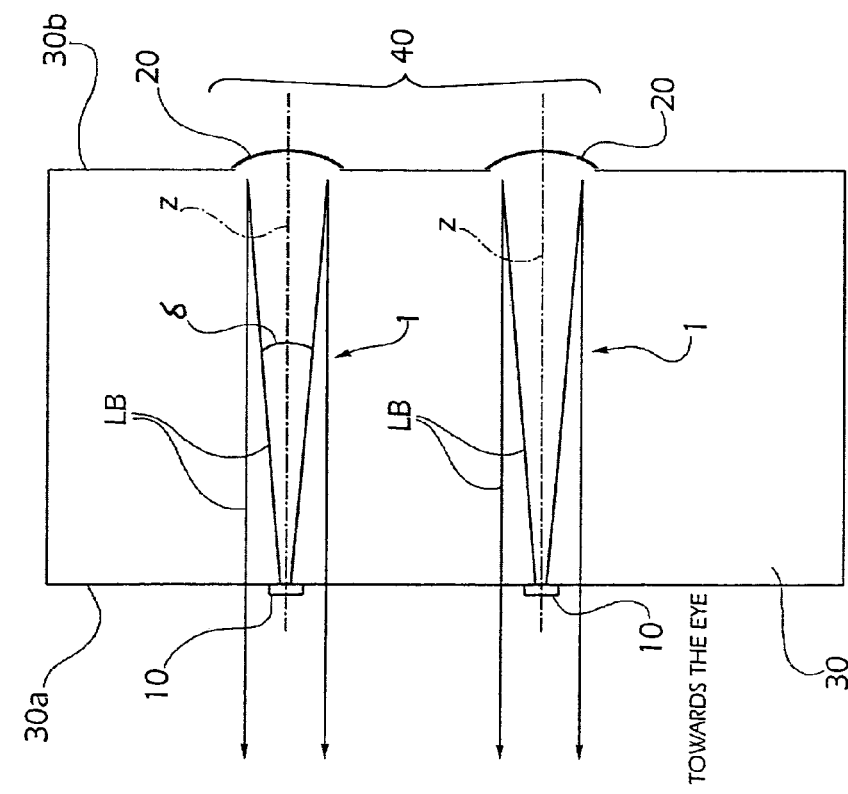

SYSTEM FOR PROJECTING A VIRTUAL IMAGE WITHIN AN OBSERVER'S FIELD OF VIEW

BACKGROUND OF THE INVENTION

The present invention relates to a system for projecting a virtual image within an observer's field of view.

There are various known systems for projecting virtual images which are used in display devices wearable by a user and are known in the field as Head Mounted Displays, or HMDs. Some of these, which are known as see-through displays, enable a virtual image to be seen superimposed on the image of the real world. Others, which are known as non-see-through displays (for example, virtual-reality helmets or viewers for palmtops such as the commercial models produced by Sony, Canon and Olympus) enable solely a virtual image to be seen. Yet others, which are known as see-around displays (for example, MicroOptical's products) have a display screen inserted within the user's field of view. In general, all of the known systems are constituted basically by three subsystems: a micro-display which generates the real image, an optical system which focuses it at the desired distance (typically at infinity), and an optical system for projection within the user's field of view. However, the incorporation of these subsystems in a single wearable device, for example, of the spectacles type, involves problems of complexity, size and weight.

SUMMARY OF THE INVENTION

The object of this invention is to provide a system for projecting virtual images which has performances similar to that of known devices but with relatively small size and weight and with minimal energy consumption.

This object is achieved, according to the invention, by a system for projecting a virtual image within an observer's field of view having the characteristics defined in the claims.

In the system according to the invention, the need for a conventional micro-display and the respective image projection system is eliminated since the three subsystems for generating images, focusing, and projection are incorporated substantially on the surfaces of a transparent substrate such as, for example, the visor of a helmet, an ophthalmic lens, a foil in contact with a lens, etc., considerably reducing overall complexity, weight and size.

A further subject of the invention is a display device (or HMD) wearable by a user, comprising a projection system according to the invention.

BRIEF DESCRIPTION OF THE DRAWINGS

A preferred but non-limiting embodiment of the invention will now be described with reference to the appended drawings, in which:

FIGS. 2a and 2b show variants of the projection system according to the invention;

DETAILED DESCRIPTION OF THE INVENTION

Figure 1:
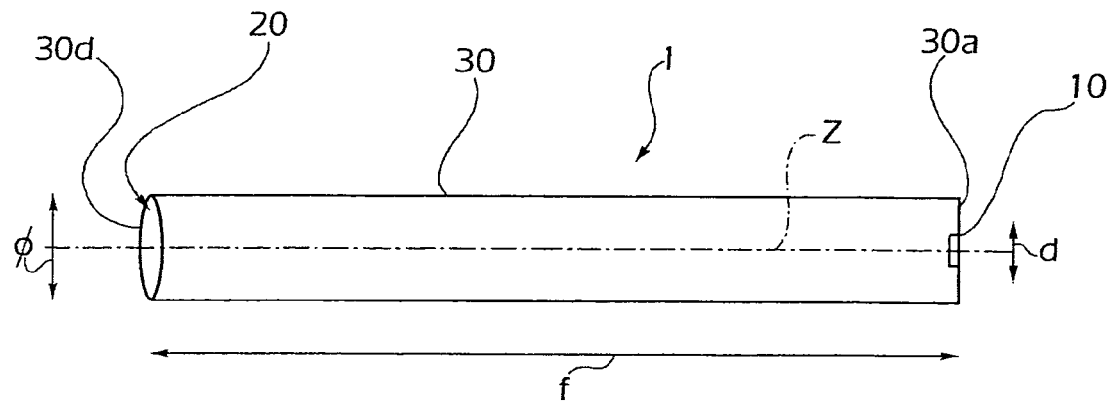
FIG. 1 is a schematic representation of a basic structure of the projection system according to the present invention.

With reference to FIG. 1, a basic structure 1 of a projection system according to the invention comprises a source 10, that is, a light-emitting device, for example, of an organic type such as an OLED or a PLED, or of an inorganic type such as a microLED, a quantum dot laser, a nanostructured metallic source, a carbon nanotube source, a metal or polymer nanowire source, or a field-emission source, having a transverse linear dimension d, and a micro-optical element 20, for example, a lens, a mirror, or a diffractive optical element (DOE) having a diameter $\Phi$, for example, of about 20-50 microns. An optical axis of the optical system formed by the emitting device 10 and by the micro-optical element 20 is indicated z in FIG. 1. The light source is disposed on the inner side, near the eye, or on the outer side, according to the type of optical configuration for projecting the luminous pixel onto the retina, which will be of the transmission type (FIG. 2b) or of the reflection type (FIG. 2a).

The emitting device 10 and the micro-optical element 20 are arranged on respective opposed surfaces 30a, 30b of a substrate 30 that is transparent to light. The transparent substrate has a thickness f, for example, of the order of 2 mm.

The transparent substrate 1 is, for example, the visor of a helmet, a spectacle lens or, in a more general case, a foil in contact with a lens.

The basic structure 1 is a subunit of an orderly set 40, for example, a matrix, shown in FIGS. 2, and 4-7, formed by a plurality of such basic structures 1 in which, in the case of a projection system of the transmission type, the emitting devices 10 are arranged in an orderly manner on the face 30a of the transparent substrate and the corresponding micro-optical elements 20 are arranged in a correspondingly orderly manner on the other face 30b.

Figure 3:
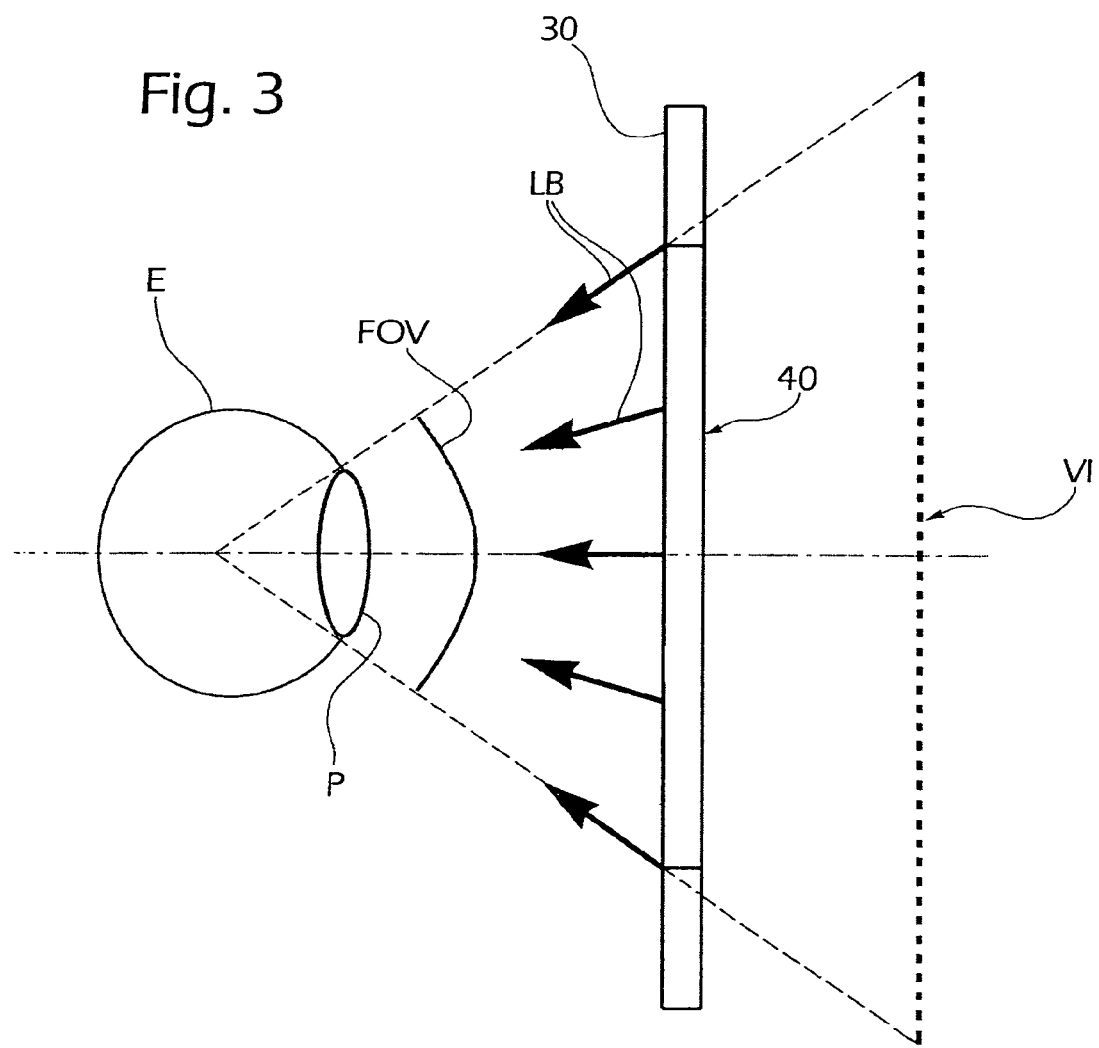
FIG. 3 is a schematic representation of the operating principle of the projection system according to the invention.

The substrate 30 is suitable to be placed in front of at least one eye (indicated E in FIG. 3) of an observer, at a distance of substantially between 25 and 50 mm from the eye with one of the faces 30a, 30b facing towards the eye and the other of the faces 30a, 30b facing towards the portion of the outside world which extends in front of the observer with respect to his direction of observation.

According to a possible variant, the transparent substrate 30 is a solid element made of transparent material.

According to another variant, the transparent substrate 30 is a hollow element formed by a pair of films of transparent material between which a cavity of the substrate 30 is interposed. In this case, the faces 30a and 30b are a face of one film and a face of the other film of the pair of films or foils, respectively.

Alternatively, as a combination of the two preceding variants, the transparent substrate 30 is a solid element made of transparent material to the faces of which are applied films of transparent material, on which the emitting devices 10 and the micro-optical devices 20 are disposed, respectively.

The micro-optical devices 20 are preferably formed directly on the face 30b of the substrate 30, for example, by known micro-machining and mass-production replication techniques.

The emitting devices 10 are preferably positioned on the face 30a of the substrate 30 by localized, in situ production techniques or alternatively by bonding techniques, in any case on a surface that is prepared electrically for the energy supply of the source.

Figure 4A:
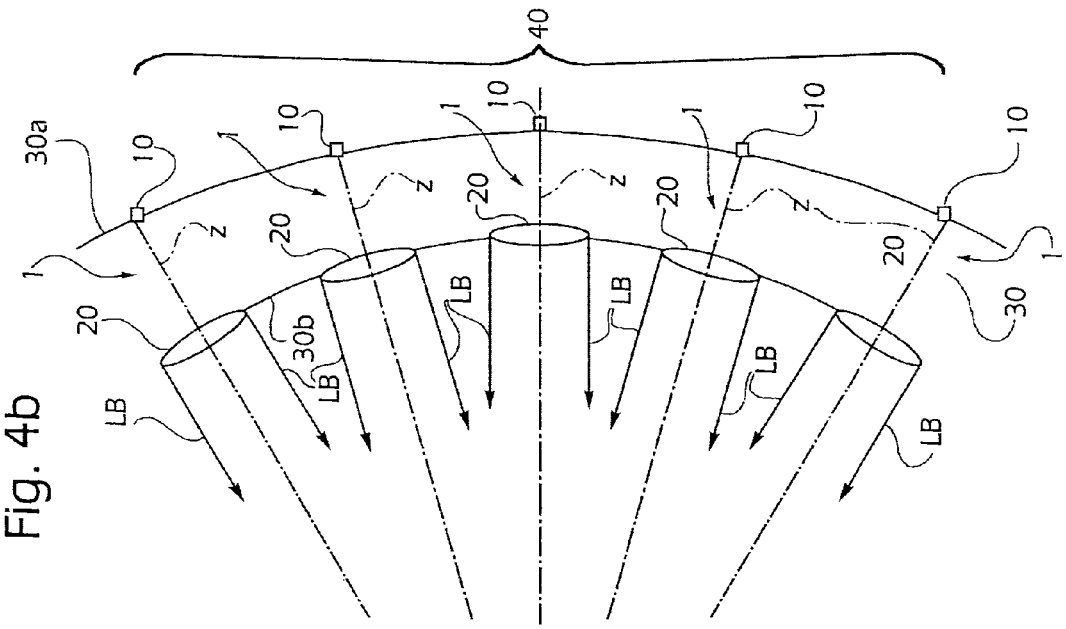
FIGS. 4a and 4b are further variants of the projection system according to the invention.
Figure 4B:
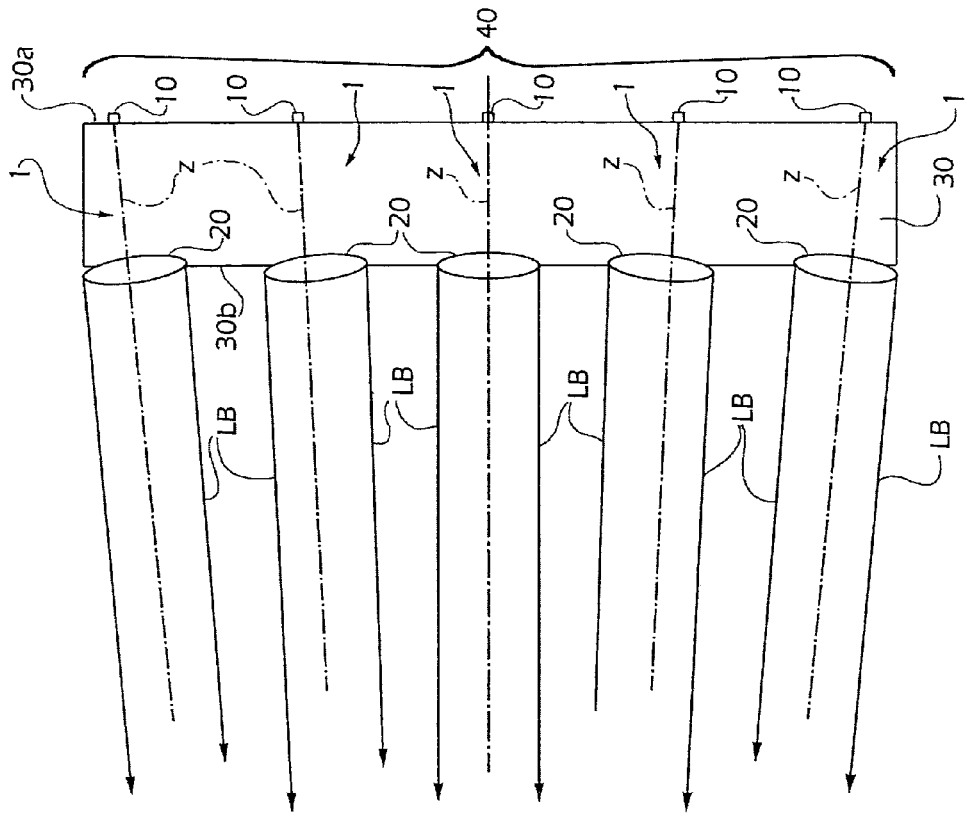
Figure 5:
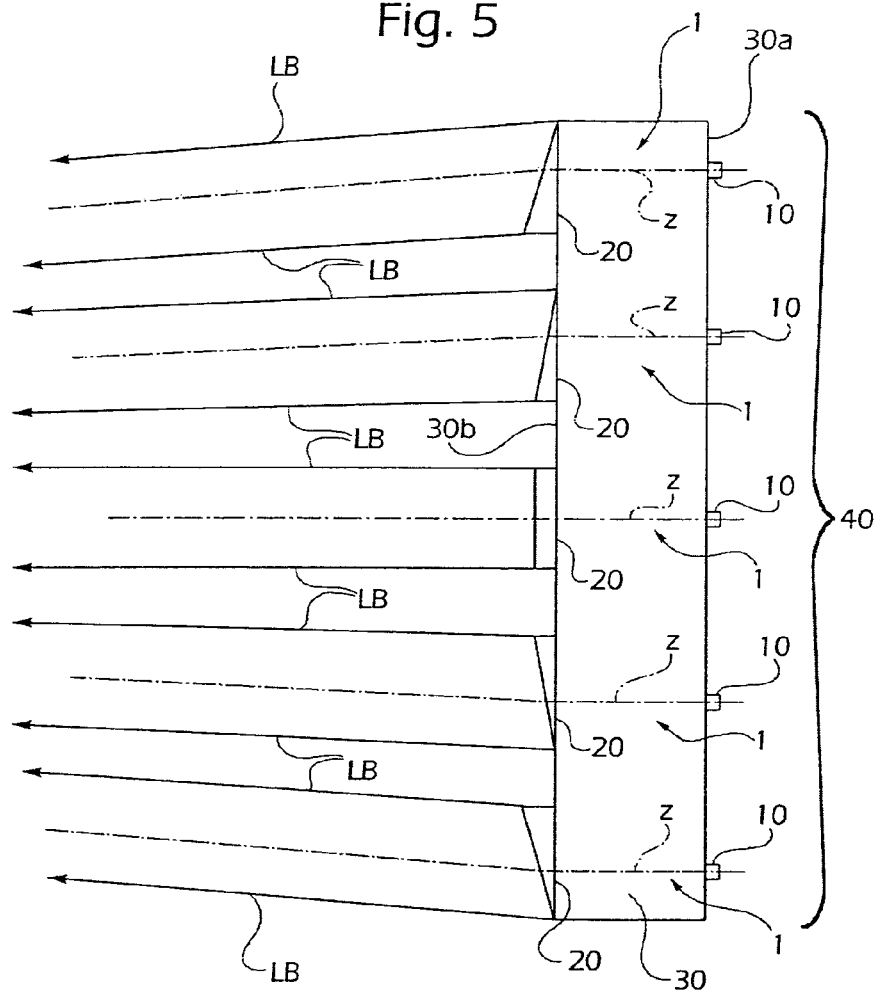
FIG. 5 shows a further variant of the projection system according to the invention in a schematic side elevational view.

According to the invention and as shown in FIGS. 2, 4 and 5, the light sources 10 of the matrix 40 that are disposed on the face 30a of the substrate 30 together emit a beam of light rays LB towards the micro-optical elements 20. Each of the micro-optical elements 20 that are disposed on the optical path of the rays emitted creates a virtual image of the corresponding source 10 (see FIG. 3), placing the virtual image at an infinite distance and directing the rays towards the pupil P of the observer's eye E. This is achieved in practice when the source 10 is in the vicinity of the focus of the corresponding micro-optical element 20 and leads to the collimation of the beam emitted towards the eye E. The image created by each individual source 10 is disposed beside those created by the surrounding sources 10, creating the virtual image VI as a whole, disposed within the observer's field of view FOV.

For simplicity and clarity, the substrate 30 is shown in FIGS. 2a and 2b as having a flat shape with the optical axes z of the subunits 1 of the matrix 40 arranged perpendicularly relative to the plane in which the substrate 30 extends. In the embodiment of FIG. 2a, the micro-optical elements 20 are formed as mirrors so that the face 30a of the substrate 30 on which the emitting devices 10 are disposed faces towards the observer's eye. In the embodiment of FIG. 2b, the micro-optical elements 20 are formed as lenses or optical elements which operate by refraction or by diffraction so that the face 30a of the substrate 30 on which the emitting devices 10 are disposed faces the portion of the outside world which extends in front of the observer, with respect to his direction of observation.

To prevent the light emitted by a source 10 falling not only on the corresponding micro-optical element but also on the adjacent micro-optical elements, thus creating parasitic images, micro-sources 10 with highly collimated emission, for example, with an overall divergence δ of less than 10° may be used. Alternatively, the projection system according to the invention may be constructed with a "fly's eye" structure. According to this variant, each subunit 1 of the matrix 40 is formed as a tube portion of transparent material, but with opaque side walls, which extends along the optical axis z and in which the source 10 is fixed at one end and the micro-optical element 20 is formed at the other end. More generally, slits, apertures or stops may be disposed between the emitter and the collimation optical element to limit the propagation of parasitic rays.

FIGS. 4a, 4b and 5 show three possible variants of the invention for projecting the virtual image of each individual source 10 in its correct location within the observer's field of view FOV.

In FIG. 4a, the optical axes z of the individual subunits 1 of the matrix 40 are oriented towards the observer's eye. To achieve this orientation in the flat substrate 30, the individual sources 10 are no longer aligned with the corresponding micro-optical elements 20 with respect to an axis perpendicular to the plane of the substrate 30 as shown in FIGS. 2a and 2b, but each source 10 is displaced laterally relative to the alignment axis perpendicular to the substrate 30, with respect to the corresponding micro-optical element 20. This displacement becomes greater towards the periphery of the observer's field of view FOV. Moreover, the micro-optical elements 20 are inclined to the axes perpendicular to the plane of the substrate 30 and this inclination varies as their position varies from the centre to the periphery of the observer's field of view FOV.

The optical axes z of the individual subunits 1 of the matrix 40 are also oriented towards the observer's eye in FIG. 4b. In contrast with the variant of FIG. 4a, the orientation of the axes 5 is achieved by curvature of the substrate 30 on which the subunits 30 of the projection system according to the invention are disposed.

In the variant of FIG. 5, the substrate 30 is again flat and the optical axes 5 of the subunits 1 of the matrix 40 are parallel to one another and perpendicular to the plane of the substrate 30. The individual micro-optical elements 20 comprise a further, refractive or diffractive, prismatic component, so that the rays which emerge from the substrate 30 and are directed towards the observer are deflected by the prismatic components of the micro-optical elements 20 in the correct direction within the observer's field of view. FIG. 5 shows schematically the prismatic component to be added to the profile of the respective micro-optical element 20 so as to create the required field of view: a flat profile for a source 10 in a central position (requiring no deflection) and a profile which varies gradually towards the edge in order to have optimized deflection.

Figure 6:
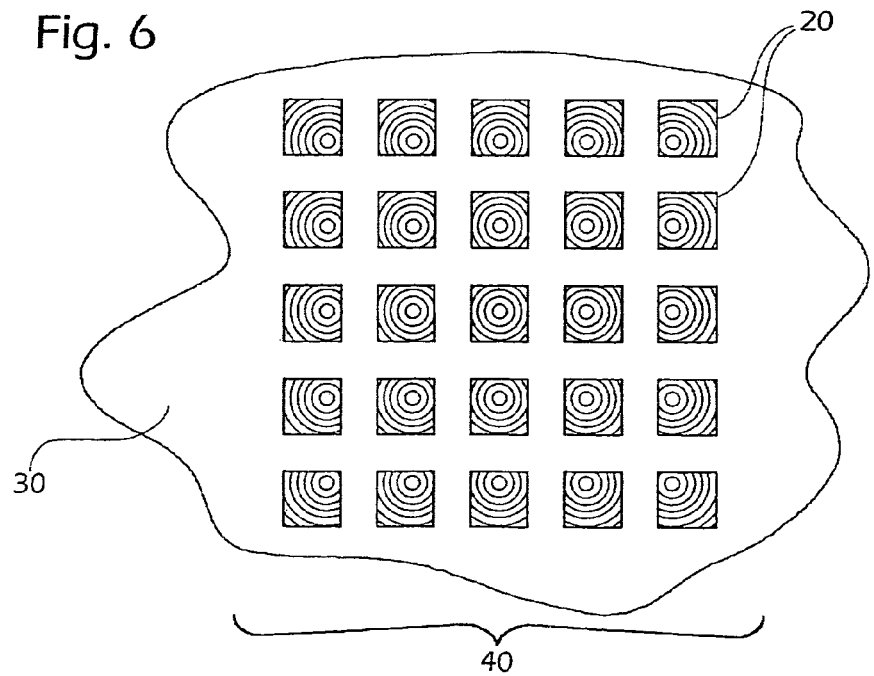
FIG. 6 is a front view of the variant of FIG. 5.

With reference to the matrix of micro-optical elements 20, the phase function of an individual micro-optical element can be expressed (in a generalization which encompasses both the refractive and the diffractive case) as:

$$\Psi_{i,j} = \Psi_{lens} + \Psi_{prism\ (i,j)}$$

where $\Psi_{lens}$ represents the phase function of the focusing optics (whether it is refractive, reflective or diffractive), and $\Psi_{prism\ (i,j)}$ represents, for each i,j-th element of the matrix, the additional prismatic component that is suitable for correcting the optical path of the collimated beam. FIG. 6 shows, in a front view, a possible appearance of the optical elements arranged in accordance with this principle. Each square represents a single micro-optical element 20 of the matrix. The concentric circles drawn within each square give an idea of the deflection imparted to the light rays by the prismatic component of the individual micro-optical element 20. In the central micro-optical element, the prismatic component has a flat profile: the central square of the matrix is concentric with the circles within it. In the peripheral micro-optical elements, the prismatic component has a more inclined profile: towards the periphery of the matrix, the centres of the circles are displaced, within the respective squares, towards one of the sides of the squares, according to the coordinates of those squares within the matrix. A wholly similar arrangement would be adopted for a reflection optical system as shown in FIG. 2a. In that case, the phase function of the reflector varies gradually from the centre of the FOV to its periphery.

Figure 7:
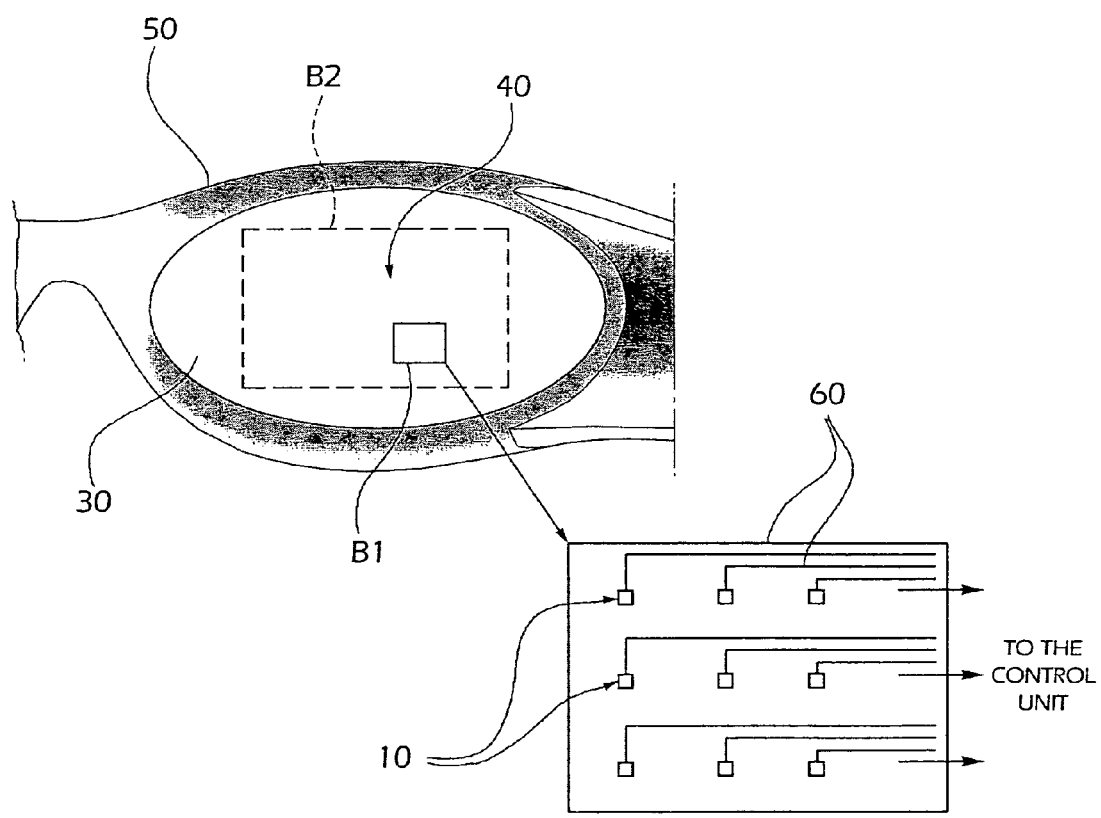
FIG. 7 is a view of a pair of spectacles provided with the projection system according to the invention.

FIG. 7 shows a projection system according to the invention applied to a pair of spectacles.

In this case, the substrate 30 is, for example, one of the lenses of the spectacles, mounted in a spectacle frame 50. FIG. 7 also shows, on an enlarged scale, a portion of the substrate 30 enclosed in a rectangle B1 drawn in continuous outline. The region of the substrate 30 occupied by the matrix 40 is represented as enclosed in a rectangle B2, drawn in broken outline.

The individual emitting pixels 10 are supplied electrically by a conventional control unit (not shown), independently of one another, for example, by means of a pattern of electrical connections 60 formed by photolithography directly on the outer surface of the lens 30 or on the film which contains the sources 10 and which is caused to adhere to the outer surface of the lens. These connections 60 are invisible to the eye since they are transparent and/or are too close to be brought into focus.

The size of an emitting pixel is typically sub-micrometric and the supply tracks are substantially transparent. The entire assembly of an emitter and of the electrical tracks is therefore substantially invisible to the naked eye. The overall portion of area B2 which is occupied by the matrix 40 of micro-optical elements/micro-sources depends on the number of pixels and therefore on the resolution of the display or on the selected density of the micro-optical elements/micro-sources on the substrate 30. Both of the standard configurations with 320×240 pixels or 640×480 pixels occupy an overall opaque area of a few square mm and are typically arranged on an overall lens area of about $2 \times 2$ cm$^2$. The matrix of emitters can be placed in a peripheral position within the observer's field of view FOV or in its centre (with a configuration similar to that shown in FIG. 6), whereas a more sparse arrangement may occupy the whole spectacle lens. In general, the size of the display will differ according to whether spectacles or a visor are involved.

The optical system of the projection matrix as a whole, whether it operates by transmission or by reflection, covers a minimal portion, typically less than one percent of the entire lens or substrate and does not therefore affect the see-through system as a whole.

Whereas, in a conventional projection system, the image-generating subsystem, the system for focusing the images into a virtual image, and the system for projecting the virtual image within the user's field of view constitute distinct and separate units, in the system according to the invention, the three subsystems are incorporated in a single unit which is formed on a transparent substrate (for example, a spectacle lens or a helmet visor) and which simultaneously generates, focuses and projects the virtual image.

Moreover, whereas, in conventional systems, the field of view is determined naturally and depends solely on the overall size of the micro-display and on the focal length of the optical system, in the system according to the invention, the field of view is created "as a mosaic" by projecting the virtual image of each individual source in the correct location within the user's field of view.

Naturally, the principle of the invention remaining the same, the details of construction and forms of embodiment may vary widely with respect to those described and illustrated, without thereby departing from the scope of the invention.

What is claimed is:

1. A system for projecting a virtual image within an observer's field of view, comprising:
   a support element,
   at least one transparent element which is mounted on the support element and which in a use condition is placed in front of at least one of the observer's eyes in order to transmit an image thereto, the transparent element comprising a first face and a second face which in said use condition face towards and away from the eye, respectively, in such a way to transmit to the eye an image of a portion of outside world extending beyond the transparent element,
   light emitting means suitable for generating a light signal, and
   projection and focusing means for projecting the light signal onto the eye in a manner such as to present the light signal as an additional image superimposed on the image of the portion of outside world, focused at a predetermined distance from the eye, wherein:
   the light emitting means comprise a plurality of light-emitting pixel devices disposed on one of the first and second faces of the transparent element, and
   the projection and focusing means comprise a plurality of optical elements associated with respective emitting devices and arranged on the other of the first and second faces of the transparent element in a manner such that each of the optical elements can create a virtual image of the emitting device associated therewith, the virtual images of the individual emitting devices together forming the additional image superimposed on the image of the portion of outside world.

2. A system according to claim 1 in which the transparent element is a solid element made of transparent glass or plastics material.

3. A system according to claim 1 in which the transparent element is a hollow element formed by a pair of films of transparent material between which a cavity of the element is interposed.

4. A system according to claim 1 in which the transparent element is a solid element made of transparent material to which are applied films or foils of transparent material on which the emitting devices and/or the optical elements are disposed, respectively.

5. A system according to claim 1 in which the optical elements are formed as mirrors so that the face of the transparent element on which the emitting devices are disposed faces towards the observer's eye.

6. A system according to claim 1 in which the optical elements are formed as lenses or optical elements which operate by refraction or diffraction, so that the face of the substrate on which the emitting devices are disposed faces towards the portion of the outside world which extends in front of the observer, with respect to his direction of observation.

7. A system according to claim 1 in which each emitting device and the optical elements associated therewith are disposed at opposite ends of tube-like portions of the transparent element, the tube-like portions having opaque side walls.

8. A system according to claim 1 in which the transparent element is flat, the emitting devices and the optical elements being arranged and oriented in a manner such that the optical axis of each system formed by an emitting device and by the respective optical element is oriented towards the observer's eye.

9. A system according to any one of claims 1 to 7 in which the transparent element is curved so that the optical axis of each system formed by an emitting device and by the respective optical element is oriented towards the observer's eye.

10. A system according to any one of claims 1 to 7 in which the optical elements comprise a prismatic component so as to project the virtual image of the respective emitting devices in predetermined positions within the observer's field of view.

11. A system according to claim 1 in which the emitting devices and the optical elements associated therewith are disposed in a matrix-like arrangement on the respective faces of the transparent element, and are distributed in a non-uniform manner, according to their position relative to the observer's field of view.

12. A system according to claim 1 in which the emitting devices are of an organic type, such as an OLED or a PLED, or of an inorganic type, such as a microLED, a quantum dot laser, a nanostructured metallic source, a carbon nanotube source, a metal or polymer nanowire source, or a field emission source.

13. A display device wearable by a user, comprising a projection system according to claim 1, comprising a control unit for controlling the emitting devices, connected to the emitting devices by means of a pattern of electrical connections arranged on the face of the transparent element on which the emitting devices are disposed.

14. A device according to claim 13 in which the curvature of the lens and the projection system as a whole are optimized jointly for the focusing of the image.

* * * * *